US011936461B2

(12) United States Patent
Hubert et al.

(10) Patent No.: US 11,936,461 B2
(45) Date of Patent: Mar. 19, 2024

(54) METHOD AND SYSTEM FOR WIRELESS COMMUNICATION BETWEEN TRANSMITTER DEVICES AND A RECEIVER DEVICE BY MEANS OF A REPEATER DEVICE WITH SIMULTANEOUS REPETITION

(71) Applicant: SIGFOX, Labege (FR)

(72) Inventors: Loïc Hubert, Saint-Sulpice-sur-Lèze (FR); Arnaud Mansuy, Toulouse (FR); Nicolas Chalbos, Eaunes (FR)

(73) Assignee: SIGFOX, Labege (FR)

( * ) Notice: Subject to any disclaimer, the term of this patent is extended or adjusted under 35 U.S.C. 154(b) by 236 days.

(21) Appl. No.: 17/426,890

(22) PCT Filed: Jan. 28, 2020

(86) PCT No.: PCT/EP2020/052060
§ 371 (c)(1),
(2) Date: Jul. 29, 2021

(87) PCT Pub. No.: WO2020/157075
PCT Pub. Date: Aug. 6, 2020

(65) Prior Publication Data
US 2022/0103244 A1 Mar. 31, 2022

(30) Foreign Application Priority Data
Feb. 1, 2019 (FR) ...................... 19 00994

(51) Int. Cl.
*H04J 3/16* (2006.01)
*H04B 7/155* (2006.01)
*H04L 1/08* (2006.01)

(52) U.S. Cl.
CPC .......... *H04B 7/15542* (2013.01); *H04L 1/08* (2013.01)

(58) Field of Classification Search
CPC .. H04B 7/15542; H04B 7/155; H04B 7/2606; H04W 74/06; H04W 52/246; H04W 52/0229; H04W 52/46; Y02D 30/70; H04L 1/08; H04L 67/60
USPC ....................................... 370/315
See application file for complete search history.

(56) References Cited

U.S. PATENT DOCUMENTS

| 2006/0153132 A1* | 7/2006 | Saito ............... H04W 74/06 370/329 |
| 2007/0060048 A1* | 3/2007 | Kang .............. H04W 88/04 455/13.1 |
| 2012/0257532 A1* | 10/2012 | Nakada .......... H04B 7/2606 370/252 |

(Continued)

*Primary Examiner* — Edan Orgad
*Assistant Examiner* — Vanneilian Lalchinthang
(74) *Attorney, Agent, or Firm* — H&I PARTNERS; C. Andrew Im; Chai Im (57) ABSTRACT

A method for wireless communication between a plurality of transmitter devices and at least one receiver device using a repeater device on the surface of the Earth. Messages transmitted by transmitter devices and received by the repeater device are collected by the repeater during a collection window. The messages received during the collection window are retransmitted to the receiver device by the repeater device. The messages received during the collection window are retransmitted so that at least two messages received non-simultaneously are retransmitted simultaneously to the receiver device.

17 Claims, 3 Drawing Sheets

(56) References Cited

U.S. PATENT DOCUMENTS

| | | | | |
|---|---|---|---|---|
| 2014/0149903 A1* | 5/2014 | Ahn | ................. | G06F 3/0484 |
| | | | | 715/765 |
| 2018/0062803 A1* | 3/2018 | Zirphile | ................. | H04L 5/0005 |
| 2018/0102861 A1* | 4/2018 | Ashworth | ........... | H04B 7/15578 |
| 2018/0173429 A1* | 6/2018 | Bonanno | ............. | G11C 11/4074 |
| 2018/0376391 A1* | 12/2018 | Lotter | ................. | H04W 36/06 |
| 2020/0389225 A1* | 12/2020 | Peleg | ................... | H04W 52/24 |
| 2021/0153033 A1* | 5/2021 | Peleg | ................ | H04W 52/0219 |

* cited by examiner

METHOD AND SYSTEM FOR WIRELESS COMMUNICATION BETWEEN TRANSMITTER DEVICES AND A RECEIVER DEVICE BY MEANS OF A REPEATER DEVICE WITH SIMULTANEOUS REPETITION

RELATED APPLICATIONS

This application is a § 371 application of PCT/EP2020/052060 filed Jan. 28, 2020, which claims priority from French Patent Application No. 19 00994 filed Feb. 1, 2019, each of which is incorporated herein by reference in its entirety.

FIELD OF THE INVENTION

The present invention relates to the field of digital communications, and relates more particularly to a method and a system for wireless communication between transmitter devices and a receiver device by means of a repeater device.

BACKGROUND OF THE INVENTION

Conventionally, a repeater device can be used, for example, for increasing the range of a wireless communication system including terminals and a wireless access network including a plurality of base stations. This is because it may sometimes happen, for various reasons, that terminals are located out of range of the base stations, so that the messages transmitted by these terminals cannot be received by the wireless access network.

In such a case, it is possible to provide a repeater device, placed for example between the terminals and a base station of the wireless access network, so that the repeater device is configured to receive the messages sent by the terminals, and so that the wireless access network is configured to receive the messages transmitted by the repeater device. In such a case, the repeater device retransmits, to the wireless access network, the messages previously received from the terminals, so that the terminals can exchange messages with the wireless access network by means of the repeater device.

However, using a repeater device may prove to be complex in the case where the messages are exchanged in a frequency band subject to regulatory constraints making it necessary to limit the temporal occupation of the frequency band by any one item of equipment. It will be understood that, if the number of terminals located within range of the repeater device is high, then the number of messages retransmitted by the repeater device will also be high, and will require a temporal occupation of the frequency band for retransmission that will be incompatible with the regulatory constraints in force. Such regulatory constraints exist in particular for the ISM (Industrial, Scientific and Medical) bands, which correspond to so-called free frequency bands in that they can be used without prior administrative authorization. Because of this, the ISM bands are particularly advantageous for applications of the M2M (Machine-to-Machine) type or of the Internet of Things or IoT type. For these applications, the number of terminals liable to send messages to be retransmitted may prove to be very high, and therefore prove to be incompatible with the use of a repeater device in the ISM bands.

OBJECT AND SUMMARY OF THE INVENTION

The objective of the present invention is to remedy all or some of the limitations of the solutions of the prior art, in particular those disclosed above, by proposing a solution that makes it possible to limit the temporal occupation of a frequency band by a repeater device, including when the number of messages received and to be retransmitted is high, for example to comply with the regulatory constraints applicable to the frequency band.

To this end, and according to a first aspect, the invention relates to a method for wireless communication between a plurality of transmitter devices and at least one receiver device by means of a repeater device on the surface of the Earth, the transmitter device transmitting messages in a frequency band of the transmitter devices that are received by the repeater device, the repeater device retransmitting in the frequency band the received messages to at least one receiver device. The wireless communication method includes steps of:

collecting, by the repeater device, messages sent by transmitter devices and received by the repeater device during a collection window, and retransmitting, by the repeater device, the messages received during the collection window to the at least one receiver device, the messages received during the collection window being retransmitted so that at least two messages received non-simultaneously are retransmitted simultaneously to said at least one receiver device.

Thus, rather than retransmitting a message immediately after having received it, the repeater device begins by collecting, throughout the whole of the duration of a collection window, messages sent by transmitter devices. After having collected the messages received during the period of the collection window, the messages received are retransmitted so that at least two messages received non-simultaneously are retransmitted simultaneously by the repeater device.

"Retransmitting two messages simultaneously" means that the two messages retransmitted have a total time overlap between them. "Total time overlap" means that the time overlap between two messages transmitted simultaneously has a duration equal to the duration of the shortest message among the two messages retransmitted simultaneously, or with a duration equal to the duration of the two messages if these have the same duration. On the other hand, "two messages received non-simultaneously" means that the two messages received have no time overlap between them (for example they are received one after the other) or have a partial time overlap between them, i.e., a time overlap between them that is not total.

Because messages received non-simultaneously by the repeater device are retransmitted simultaneously, the temporal occupation of the frequency band used by the repeater device for retransmitting the messages is very much less than it would have been for retransmitting each message immediately after it was received by the repeater device, since the time overlap between messages is increased.

Preferably, each message retransmitted by the repeater device is retransmitted simultaneously with at least one other message. Even more preferentially, all the messages received during the collection window are retransmitted simultaneously. A plurality of messages (strictly greater than two in number) is retransmitted simultaneously if the longest message is retransmitted simultaneously with each of the other messages retransmitted, i.e., the longest message is retransmitted with a total time overlap with each of the other messages retransmitted. Thus, the temporal occupation when a plurality of messages is retransmitted simultaneously is equal to the duration of the longest message among the messages retransmitted simultaneously.

In particular embodiments, the wireless communication method may furthermore include one or more of the following features, taken in isolation or according to all technically possible combinations.

In particular embodiments, when a plurality of messages have been received during the collection window, the messages are retransmitted simultaneously as long as the total instantaneous power of the messages retransmitted simultaneously is lower than a predefined maximum power.

In particular embodiments, the collection window is interrupted as soon as the total instantaneous power necessary for simultaneously retransmitting all the messages received during the collection window is greater than a predefined maximum power.

In particular embodiments, when the total instantaneous power necessary for simultaneously retransmitting all the messages received during the collection window is greater than the predefined maximum power, only some of the messages received during the collection window are retransmitted simultaneously.

This is because the regulatory constraints in force, in particular for the ISM bands, may impose a maximum power not to be exceeded when the radio signals are retransmitted. Consequently, the messages received can be retransmitted simultaneously in so far as the total instantaneous power of the messages retransmitted simultaneously remains less than the maximum power during the retransmission. If the number of messages received during the collection window is high, then it may be impossible from a regulatory point of view to retransmit all these messages simultaneously, unless the transmission power of each message is reduced excessively. In this case, it is for example possible to form groups of messages so that the total instantaneous power necessary for simultaneously retransmitting all the messages in the same group is less than the maximum power. Thus, all the messages in the same group are retransmitted simultaneously, and the repeater device first of all retransmits the messages of a first group, and then the messages of a second group, without time overlap between messages belonging to different groups.

In particular embodiments, the messages received during the collection window are sorted in decreasing order of message size, and groups are formed successively with the longest messages, the number of messages in each group being limited so that the total instantaneous power necessary for simultaneously retransmitting all the messages of the group is lower than a predefined maximum power.

In particular embodiments, the messages retransmitted simultaneously by the repeater device are retransmitted on different respective frequencies in the frequency band.

Such provisions make it possible to limit interference between messages retransmitted simultaneously by the repeater device. In more general terms, any technique known to a person skilled in the art making it possible to multiplex messages retransmitted simultaneously may be used. In particular, it is also possible, according to other examples, to use code division multiple access (CDMA) for simultaneously retransmitting the messages received by the repeater device.

In particular embodiments, the messages being received on different respective frequencies in the frequency band, the messages are retransmitted on different respective frequencies determined according to the frequencies on which the messages were received.

In particular embodiments, the frequencies on which the messages are retransmitted simultaneously are identical to the frequencies on which the messages were received during the collection window.

In particular embodiments, the wireless communication method includes steps of:

measuring, by the repeater device, instants of reception of the messages received during the collection window, determining, by the repeater device and according to the instants of reception of the messages, respective values of a physical property of the messages to be used during the retransmission of the messages, and retransmitting messages by the repeater device, using the values of the physical property determined according to the instants of reception of the messages.

This is because, in some applications, it may be necessary to be able to estimate the instant at which a message was received by the repeater device. For example, the instants of reception of the same message by a plurality of receiver devices and/or repeater devices with known respective geographical positions make it possible to estimate the geographical position of the transmitter device that sent the message. However, because the messages are first of all collected during the period of the collection window and are then retransmitted simultaneously by the repeater device, the instants of reception of the messages by the repeater device cannot be determined by a receiver device that receives the retransmitted messages.

Advantageously, the values of a predetermined physical property of the messages to be retransmitted can be determined according to the respective instants of reception of the messages by the repeater device. Thus a receiver device that receives the retransmitted messages can estimate the instants of reception of the messages by the repeater device from values of the physical property that are measured on the messages received from the repeater device.

The physical property is different from the instant of reception of a message. The instant of reception is encoded by means of the physical property and is therefore communicated without having to use supplementary fields in the message and therefore without having to increase the size and the duration of transmission of a message.

In particular embodiments, the values of the physical property of the messages retransmitted are determined so that a difference between a value of the physical property of a retransmitted message and a predetermined reference value of the physical property represents a time difference between a reference instant and the instant of reception of the message by the repeater device.

In particular embodiments, the wireless communication method includes a step of forming and transmitting, by the repeater device, a reference message using the reference value of the physical property.

In particular embodiments, the wireless communication method includes steps of:

measuring, by the at least one receiver device, values of the physical property of the messages received from the repeater device, and timestamping, by the at least one receiver device, the messages retransmitted by the repeater device according to the measured values of the physical property of the messages received by said at least one receiver device.

In particular embodiments, the physical property, the values of which to be used for retransmitting the messages are determined according to the instants of reception of the messages by the repeater device, corresponds to the frequency of the messages, or to the power of the messages or to the phase of the messages.

According to a second aspect, the present invention relates to a repeater device configured to receive on the surface of the Earth messages transmitted in a frequency band by transmitter devices and to retransmit in the frequency band the received messages intended for at least one receiver device. The repeater device includes means configured for:

collecting messages transmitted by the transmitter device and received by the repeater device during a collecting window, and retransmitting the messages received during the collection window to the at least one receiver device, the messages received during the collection window being retransmitted so that at least two messages received non-simultaneously are retransmitted simultaneously to said at least one receiver device.

In particular embodiments, the repeater device may furthermore include one or more of the following features, taken in isolation or according to all technically possible combinations.

In particular embodiments, the messages retransmitted simultaneously by the repeater device are retransmitted on different respective frequencies in the frequency band.

In particular embodiments, the messages being received on different respective frequencies in the frequency band, the repeater device is configured for determining the frequencies on which the messages are retransmitted according to the frequencies on which the messages were received.

In particular embodiments, the repeater device includes means configured for:

measuring the instants of reception of the messages received during the collection window, determining, according to the instants of reception of the messages, respective values of a physical property of the messages to be used during the retransmission of the messages, and retransmitting the messages using the values of the physical property that were determined according to the instants of reception of the messages.

In particular embodiments, the repeater device is configured to determine the values of the physical property of the retransmitted messages so that a difference between a value of the physical property of a retransmitted message and a predetermined reference value of the physical property represents a time difference between a reference instant and the instant of reception of the message by the repeater device.

In particular embodiments, the repeater device includes means configured for forming and transmitting a reference message using the reference value of the physical property.

In particular embodiments, the physical property, the values of which to be used for retransmitting the messages are determined according to the instants of reception of the messages by the repeater device, corresponds to the frequency of the messages, or to the power of the messages or to the phase of the messages.

According to a third aspect, the present invention relates to a wireless communication system including at least one receiver device and at least one repeater device according to any one of the embodiments of the invention, the at least one receiver device including means configured for:

measuring the values of the physical property of the messages received from the repeater device, timestamping the messages retransmitted by the repeater device according to the measured values of the physical property of the messages received by said at least one receiver device.

BRIEF DESCRIPTION OF THE FIGURES

The invention will be better understood from a reading of the following description, given by way of non-limitative example and made with reference to the figures, which show.

In these figures, references that are identical from one figure to another designate identical or similar elements. For reasons of clarity, the elements shown are not to scale, unless mentioned to the contrary.

DETAILED DESCRIPTION OF EMBODIMENTS

Figure 1:
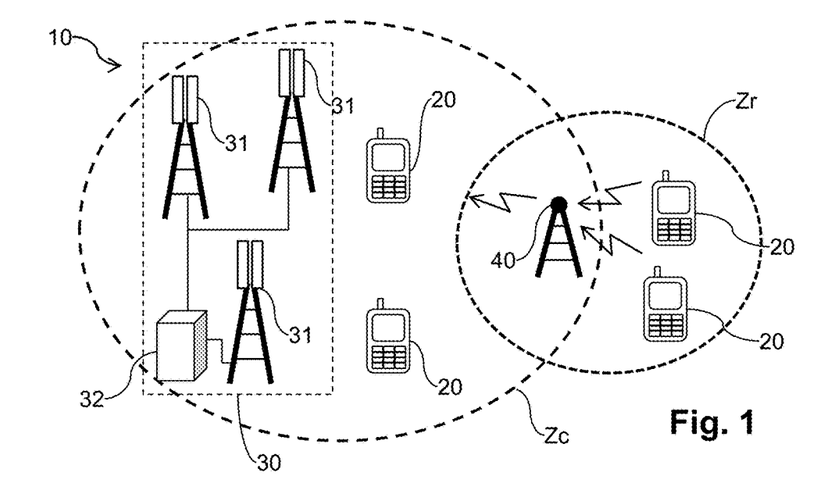
FIG. 1 is a schematic representation of an example embodiment of a wireless communication system.

FIG. 1 shows schematically a wireless communication system 10, including a plurality of terminals 20 and an access network 30 including a plurality of base stations 31.

The terminals 20 and the base stations 31 of the access network exchange messages in the form of radio signals. "Radio signal" means an electromagnetic wave propagating via non-cable means, the frequencies of which lie in the traditional spectrum of radio waves (a few hertz to several hundreds of gigahertz).

The terminals 20 are for example configured to transmit messages on an uplink to the access network 30, in a predefined frequency band. The frequency band used on the uplink is preferably an ISM band, for example with frequencies below 1 gigahertz. Each base station 31 is configured to receive the messages from the terminals 20 that are situated within range thereof. Each message thus received is for example transmitted to a server 32 of the access network 30, optionally accompanied by other information such as an identifier of the base station 31 that received it, the frequency of the received message, etc. The server 32 processes for example all the messages received by the base stations 31.

Furthermore, the access network 30 may also be configured to transmit, by means of the base stations 31, messages on a downlink intended for the terminals 20, which are where applicable configured to receive them. The messages are sent over the downlink in a predefined frequency band. The frequency band used on the downlink may be distinct from the frequency band used on the uplink, or the same frequency band may be used both on the uplink and on the downlink.

As illustrated by FIG. 1, some terminals 20 are located out of range of the access network 30, i.e., they are located outside a coverage area Zc of the access network 30. To enable these terminals 20 to exchange messages with the access network 30, the wireless communication system 10 includes a repeater device 40, which is in the coverage area Zc.

Preferably, the repeater device 40 is situated on the surface of the Earth. "Situated on the surface of the Earth" means that the repeater device 40 is located at an altitude equal to or less than 25 kilometres. In particular, the repeater device 40 is not installed in a satellite in Earth orbit. Preferably, all or some of the base stations 31 and all or some of the terminals 20 are also situated on the surface of the Earth In the remainder of the description, the case is adopted non-limitatively where the repeater device 40 is implemented on the uplink, that is to say for receiving messages transmitted by terminals 20 and retransmitting them to the access network 30.

Nothing however excludes, according to other examples, implementing the repeater device 40 on the downlink, i.e., for receiving messages sent by base stations 31 and retransmitting them to terminals 20. In general terms, the repeater device 40 may be implemented on the uplink and/or the downlink.

The repeater device 40 may implement more or less complex processing operations. The choice of a particular type for the repeater device 40 constitutes merely a variant implementation of the invention.

The repeater device 40 is configured to receive, in the frequency band of the uplink, the messages from the terminals 20 that are located within range thereof (represented by a coverage area Zr in FIG. 1). The received messages are retransmitted, in the frequency band of the uplink on which the messages were received, to the access network 30. The retransmitted messages are received by at least one base station 31 within range of which the repeater device 40 is located.

Preferably, the messages retransmitted by the repeater device 40 are formed according to the same communication protocol as the messages transmitted by the terminals 20. Thus, a base station 30 receives the messages retransmitted by the repeater device 40 in the same manner as the messages received from the terminals 20 that are located within range thereof, and therefore as if they had been received directly from the terminals 20 that are located outside the range thereof. In other words, it is the same reception module of the base station 31 that is used for receiving each message transmitted on the uplink, whether it be a message transmitted by the terminal 20 or a message retransmitted by the repeater device 40.

Figure 2:
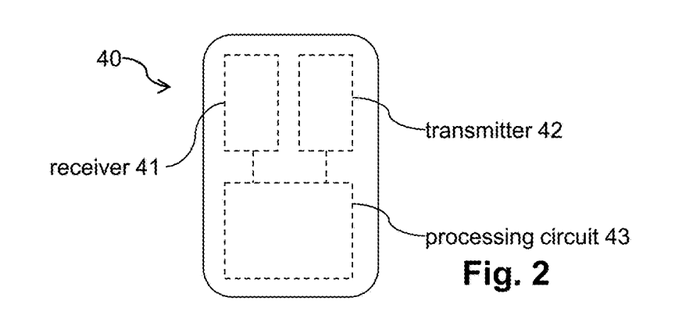
FIG. 2 is a schematic representation of an example embodiment of a repeater device.

FIG. 2 shows schematically a non-limitative example embodiment of a repeater device 40. As illustrated by FIG. 2, the repeater device 40 includes a receiver 41, a transmitter 42 and a processing circuit 43.

The receiver 41 is configured to receive the messages transmitted over the uplink and the transmitter 42 is configured to (re)transmit messages on the uplink. The receiver 41 and the transmitter 42 include in particular respective radio circuits including equipment (antenna, amplifier, local oscillator, mixer, analogue filter, etc.) known to a person skilled in the art.

The processing circuit 43 is configured to implement the necessary processing operations after reception by the receiver 41 and before (re)transmission by the transmitter 42, and in particular to implement, with the receiver 41 and the transmitter 42, the steps that relate to the repeater device 40 of a wireless communication method 50 that will be described below. The processing circuit 43 includes for example one or more processors and storage means (magnetic hard disk, electronic memory, optical disk, etc.) wherein a computer program product is stored, in the form of a set of program code instructions to be executed. Alternatively or in addition, the processing circuit 43 includes one or more programmable logic circuits (FPGA, PLD, etc.) and/or one or more specialized integrated circuits (ASIC, etc.), and/or a set of discrete electronic components, etc.

In other words, the processing circuit 43, the receiver 41 and the transmitter 42 correspond to means configured by software (specific computer program product) and/or hardware (FPGA, PLD, ASIC, discrete electronic components, radio circuit, etc.) to implement the steps that relate to the repeater device 40 of a wireless communication method 50 described hereinafter.

In the remainder of the description, the case is adopted non-limitatively where the terminals 20 transmit messages asynchronously in time on an uplink to the access network 30. "Transmitting asynchronously in time" means that the terminals 20 autonomously determine when they transmit, without coordination of the terminals 20 with the base stations 31 of the access network 30. The base stations 31 are therefore configured to be able to receive messages at arbitrary instants, not a priori known to the base stations 31.

Figure 3:
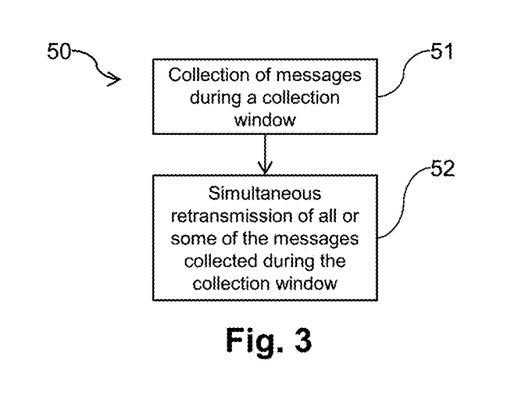
FIG. 3 is a diagram illustrating the main steps of a wireless communication method.

FIG. 3 shows schematically the main steps of a method 50 for wireless communication between the terminals 20 and the access network 30, by means of the repeater device 40.

As illustrated by FIG. 3, the wireless communication method 50 includes steps of:

51 collecting, by the repeater device 40, messages transmitted by terminals 20 in the frequency band of the uplink and received by the repeater device 40 during a collection window, and

52 retransmission, by the repeater device 40 and in the frequency band of the uplink, the messages received during the collection window to at least one base station 31 of the access network 30, the messages received during the collection window being retransmitted so that at least two messages, received non-simultaneously by the repeater device 40, are retransmitted simultaneously by the repeater device 40.

Thus, the repeater device 40, rather than immediately retransmitting each received message, commences by collecting, throughout the duration of a collection window, messages transmitted by terminals 20.

The duration of the collection window must make it possible to collect at least two messages that are not received simultaneously by the repeater device 40. Consequently, the duration of the collection window is advantageously at least two times greater than a reference duration of the messages transmitted by the terminals 20. If all the messages have the same duration, then the reference duration corresponds to the duration of each message. If the messages do not all have the same duration, the reference duration corresponds to the minimum duration that a message transmitted by a terminal 20 can last.

In preferred embodiments, the duration of the collection window is at least five times greater than the reference duration of the messages, or even at least ten times greater than the reference duration.

The duration of the collection window may be static or dynamic. In the case of a static duration, the duration of the collection window does not vary over time and is for example fixed at five or ten times the reference duration of the messages. In the case of a dynamic duration, the duration of the collection window may vary over time. In particular, it is possible to interrupt the collection window as soon as a predefined maximum number of messages to be retransmitted has been received by the repeater device 40, or as soon as the total instantaneous power necessary for simultaneously retransmitting all the messages received in a collection window is higher than a predefined threshold. In such a case, the duration of the collection window is not known a priori, subject possibly to not exceeding a predefined maximum duration.

After having collected messages during the period of the collection window, the repeater device 40 retransmits the messages received. More particularly, the repeater device 40 simultaneously retransmits at least two messages that were not received simultaneously by the repeater device 40. In preferred embodiment, the repeater device 40 may simultaneously retransmit all the messages received, in order to minimize the temporal occupation required for retransmission.

In some cases, it may prove difficult to simultaneously retransmit all the messages received during the collection window. In particular, if the number of messages received is great, then a simultaneous retransmission of all these messages could require an excessively great total instantaneous power, for example higher than a maximum power predefined by regulatory constraints. In such a case, the repeater device 40 may for example, as indicated previously, interrupt the collection window as soon as a predefined maximum number of messages to be retransmitted has been received by the repeated device 40. Where applicable, the maximum number of messages to be retransmitted is selected so as to ensure that the total instantaneous power for simultaneously retransmitting these messages does not exceed the authorized maximum power.

According to another example, the messages are retransmitted simultaneously as long as the total instantaneous power of the simultaneously retransmitted messages is lower than the authorized maximum power. If the total instantaneous power necessary for simultaneously retransmitting all the messages received during the collection window is higher than the authorized maximum power, only some of the messages received during the collection window are retransmitted simultaneously. In this case it is for example possible to form groups of messages so that the total instantaneous power necessary for simultaneously retransmitting all the messages of the same group is lower than the maximum power.

It is for example advantageous to sort the messages received during the collection window in decreasing order of message size, and to successively form groups with the longest messages, the number of messages in each group being limited so that the total instantaneous power necessary for transmitting all the messages of the group is lower than a predefined threshold corresponding for example to an authorized maximum power. Such arrangements make it possible in fact to optimize the temporal occupation of the frequency band used by the repeater device for retransmitting the messages while complying with the authorized maximum power.

In the remainder of the description, the case is adopted non-limitatively where all the messages received during the collection window are retransmitted simultaneously by the repeater device 40.

Figure 4:
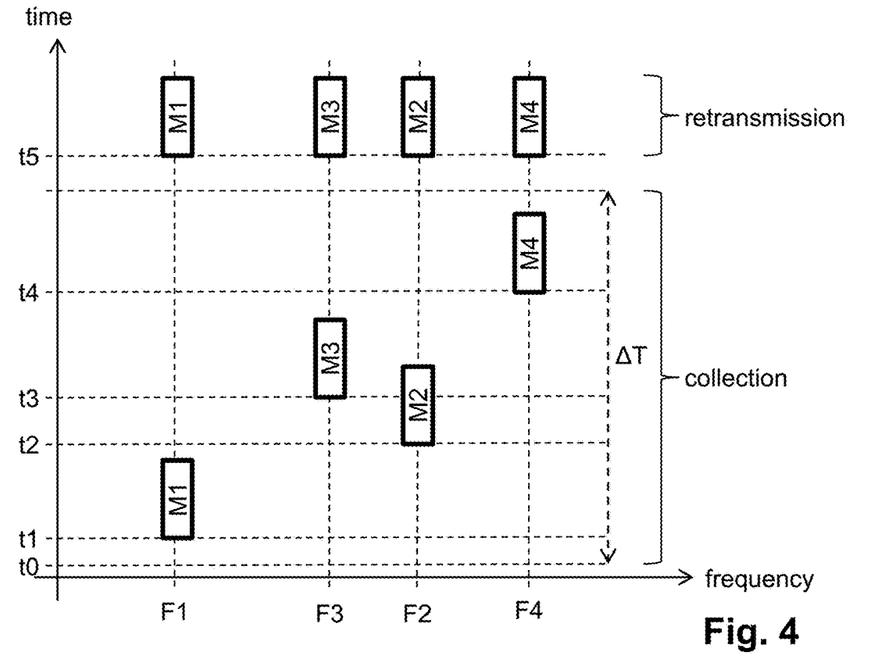
FIG. 4 is a spectrogram illustrating the operation of the wireless communication method of FIG. 3.

FIG. 4 shows schematically a spectrogram, i.e., a frequency/time representation of the radio signals in the frequency band used for transmitting and retransmitting on the uplink messages by the terminals 20 and by the repeated device 40.

In the example illustrated by FIG. 4, the case is adopted non-limitatively where the messages are transmitted by the terminals 20 on different respective frequencies in the frequency band of the uplink. For example, the terminals 20 may transmit their messages asynchronously in frequency on the uplink. "Transmitting asynchronously in frequency" means that the terminals 20 autonomously determine on which frequency they transmit, without coordination of the terminals 20 with the base stations 31 of the access network 30. The base stations 31 (and the repeater device 40) are therefore configured to be able to receive messages on arbitrary frequencies in the frequency band of the uplink, not a priori known to the base stations 31 (and to the repeater device 40).

For example, the messages transmitted by the terminals 20 and retransmitted by the repeater device 40 may be at ultra-narrow band. "Ultra-narrow band" or UNB means that the instantaneous frequency spectrum of the messages transmitted by the terminals 20 and retransmitted by the repeater device 40 has a frequency width of less than two kilohertz, or even less than one kilohertz. Such arrangements are particularly advantageous in that it is possible to frequency multiplex a large number of messages in a given frequency band, and furthermore to limit collisions between messages in the case where these are transmitted asynchronously in frequency.

It should be noted that nothing excludes, according to other examples, having all or some of the messages transmitted on the same frequency. Where applicable, the messages are for example multiplexed on the uplink using a code division multiple access (CDMA).

In the example illustrated by FIG. 4, the case is adopted non-limitatively where all the messages have the same duration. As indicated previously, the present invention is however also applicable in the case where the messages do not all have the same duration.

As illustrated by FIG. 4, the repeater device 40 receives, during the collection window, considered to be of duration $\Delta T$ and beginning at an instant t0 in FIG. 4:

a first message M1 at an instant t1 (t1>t0), on a frequency F1 in the frequency band of the uplink, a second message M2 at an instant t2 (t2>t1), on a frequency F2 in the frequency band of the uplink, a third message M3 at an instant t3 (t3>t2), on a frequency F3 in the frequency band of the uplink, and a fourth message M4 at an instant t4 (t4>t3), on a frequency F4 in the frequency band of the uplink.

In the example illustrated by FIG. 4, the messages received do not have any time overlap with each other, with the exception of the messages M2 and M3, which have a partial time overlap.

After having collected the messages M1 to M4 during the period $\Delta T$ of the collection window, the repeater device 40 retransmits the messages M1 to M4 simultaneously, at an instant t5 (t5≥t0+$\Delta T$) on different respective frequencies, for example by means of a vector modulator.

In the non-limitative example illustrated by FIG. 4, the repeater device 40 retransmits each message on the frequency on which the message was received. Thus, the method M1 is retransmitted on the frequency F1, the message M2 is retransmitted on the frequency F2, etc. Such arrangements are advantageous, for example, in the case where the access network 30 knows a priori the frequencies on which the terminals 20 transmit their messages, i.e., in the case where the terminals 20 do not transmit the messages asynchronously in frequency.

On the other hand, in the case in particular where the access network 30 does not a priori know the frequencies on which the terminals 20 transmit their messages, for example because the terminals 20 transmit the messages asynchronously in frequency, then it is possible to retransmit the messages on frequencies different from those on which the messages were received by the repeater device 40.

The retransmission frequencies are for example determined, in the frequency band of the uplink, according to the reception frequencies. For example, the repeater device 40 can apply a predefined frequency offset ΔF. Where applicable, the message M1 is retransmitted on the frequency (F1+ΔF), the message M2 is retransmitted on the frequency (F2+ΔF), etc.

Nothing however excludes, according to other examples, determining the retransmission frequencies, in the frequency band of the uplink, independently of the reception frequencies.

Figure 5:
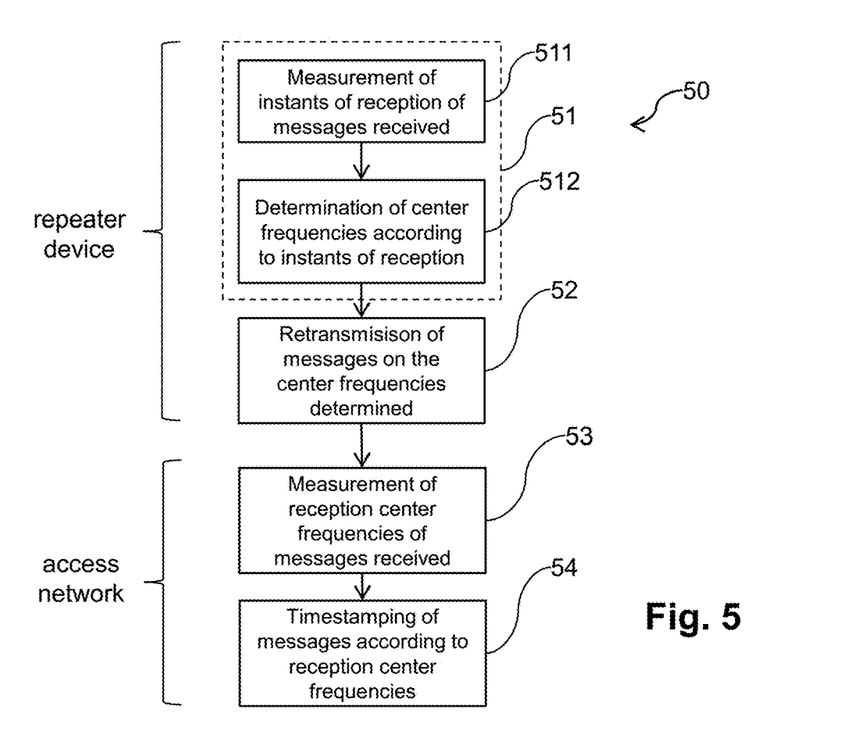
FIG. 5 is a diagram illustrating a preferred embodiment of the wireless communication method.

FIG. 5 shows schematically the main steps of a preferred embodiment of the wireless communication method 50, wherein the retransmission frequencies of the messages are determined according to the instants of reception of the messages by the repeater device 40. As illustrated by FIG. 5, the collection step 51 includes the steps of:

511 measuring, by the repeater device 40, the instants of reception of the messages received during the collection window, and 512 determining, by the repeater device 40, the frequencies on which the messages must be retransmitted according to the instants of reception of the messages.

Next, during the retransmission step 52, the messages are retransmitted by the repeater device 40 on the frequencies determined according to the instants of reception of the messages.

During the determination step 512, the retransmission frequencies are determined so that two messages received at different instants are retransmitted on different frequencies. Preferably, the function used for determining the retransmission frequencies is such that a frequency within the frequency band of the uplink corresponds only to a single instant of reception within the collection window. Optionally, a plurality of frequencies within the frequency band of the uplink may correspond to the same reception instant within the collection window. This is because, if two messages are received at the same instant on two different frequencies, they cannot be retransmitted simultaneously on the same frequency (except possibly in the case of a code division multiple access). By associating a plurality of possible frequencies with the same reception instant within the collection window, these two messages will therefore be able to be retransmitted on different respective frequencies, both representing the instant at which these two messages were received simultaneously.

In the remainder of the description, the case is adopted non-limitatively where each reception instant within the collection window corresponds to a single frequency within the frequency band of the uplink, and wherein each frequency within the frequency band corresponds to a single instant of reception within the collection window.

In preferred embodiments, the frequencies of retransmission of the messages are determined so that a difference in frequency between a message retransmission frequency and a predetermined reference frequency represents a difference in time between a reference instant and the instant of reception of the message by the repeater device 40. The reference instant is for example the instant t0 of start of the collection window, the instant (t0+ΔT) of end of the collection window, a predefined instant within the collection window, the instant t5 of retransmission of the message, etc. The reference frequency is for example the minimum frequency Fmin of the frequency band of the uplink, the maximum frequency Fmax of the frequency band of the uplink, a predefined frequency within the frequency band of the uplink, etc.

In the remainder of the description, the case is adopted non-limitatively where the reference instant corresponds to the instant t0 of start of the collection window, and where the reference frequency corresponds to the minimum frequency Fmin of the frequency band of the uplink. For example, the difference in frequency is proportional to the difference in time. For a message Mm received at an instant tm, the difference in frequency ΔFm determining the frequency F'm of retransmission is for example determined according to the following expression:

$$\Delta Fm = (Fmax - Fmin) \times (tm - t0)/\Delta T.$$

Figure 6:
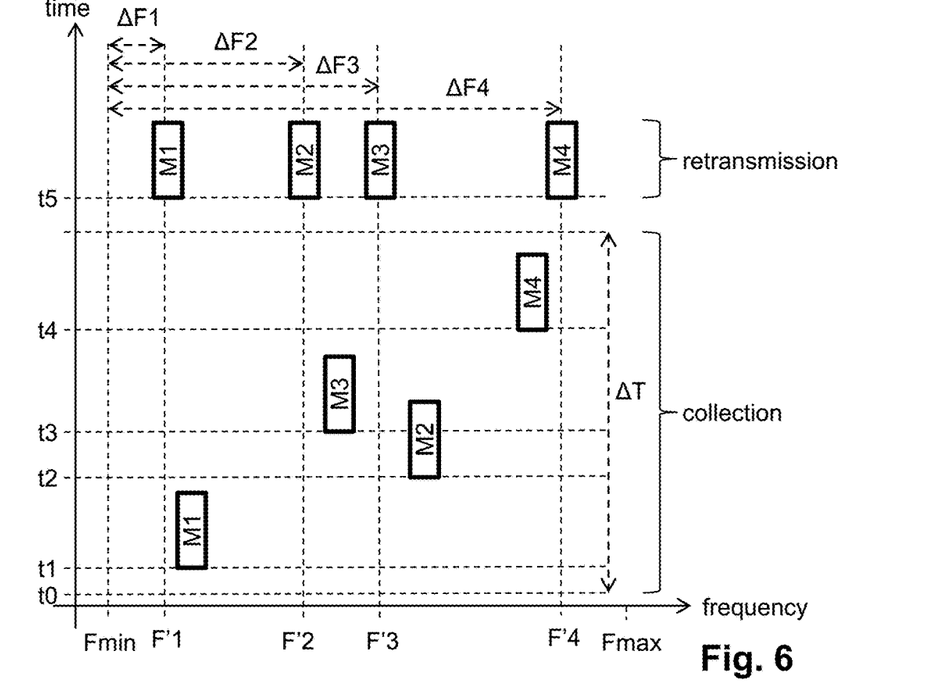
FIG. 6 is a spectrogram illustrating the operation of a first variant of the wireless communication method of FIG. 5.

FIG. 6 shows schematically a spectrogram, i.e., a frequency/time representation of the radio signals in the frequency band of the uplink. As in FIG. 4, the repeater device 40 receives four messages M1 to M4 at respective instants t1 to t4, on respective frequencies F1 to F4 (not referenced in FIG. 6 for reasons of clarity of the figure). The repeater device 40 next simultaneously retransmits the messages M1 to M4 on respective frequencies F'1 to F'4 obtained by applying frequency differences ΔF1 to ΔF4. By applying the previous expression for calculating the frequency differences, the following expressions are obtained for the retransmission frequencies F'1 to F'4:

$$F'1 = Fmin + (Fmax - Fmin) \times (t1 - t0)/\Delta T,$$

$$F'2 = Fmin + (Fmax - Fmin) \times (t2 - t0)/\Delta T,$$

$$F'3 = Fmin + (Fmax - Fmin) \times (t3 - t0)/\Delta T, \text{ and}$$

$$F'4 = Fmin + (Fmax - Fmin) \times (t4 - t0)/\Delta T.$$

As illustrated by FIG. 5, the wireless communication method 50 may further include, if the access network 30 is configured for determining the instants of reception of the messages by the repeater device 40, steps of:

53 measuring, by the access network 30, the reception frequencies of the messages retransmitted by the repeater device 40, and 54 timestamping, by the access network 30, of the messages retransmitted by the repeater device 40 according to the reception frequencies of the messages.

The messages retransmitted by the repeater device 40 are received by at least one base station 31 of the access network 30. By measuring the reception frequencies of the messages by a base station 31, an estimation is obtained of the retransmission frequencies of these messages by the repeater device 40. The frequencies of retransmission of the messages by the repeater device 40 having been determined from the instants of reception of the messages by applying a known function of the access network 30, it will therefore be understood that the access network 30 can estimate these reception instants from the measurements of the reception frequencies of the messages retransmitted by the repeater device 40.

In the case described above, in which the frequency difference at a reference frequency represents the difference in time between the reception instant and a reference instant, several possibilities can be envisaged for determining the instants of reception of the messages by the repeater device 40.

In particular, the reference instant, if it is not known to the access network 30, may for example be indicated in a reference message formed and transmitted by the repeater device 40. Alternatively, and non-limitatively, the access network 30 may estimate the reference instant from the instant tr at which the retransmitted messages were received by a base station 31. For example, if the reference instant corresponds to the instant t0 of start of the collection window, and considering that the access network knows the duration ΔT of the collection window, the reference instant may be estimated as being equal to (tr−ΔT) by making the following assumptions:

the propagation time between the repeater device 40 and the access network 30 is negligible, and the time elapsed between the instant (t0+ΔT) of end of the collection window and the instant t5 of retransmission of the messages by the repeater device 40 is negligible.

The repeater device 40 may also include in a reference message information enabling the access network 30 to estimate the reference instant, such as for example the duration ΔT of the collection window, the time elapsed between the instant of end of the collection window and the instant of retransmission of the messages, etc.

Figure 7:
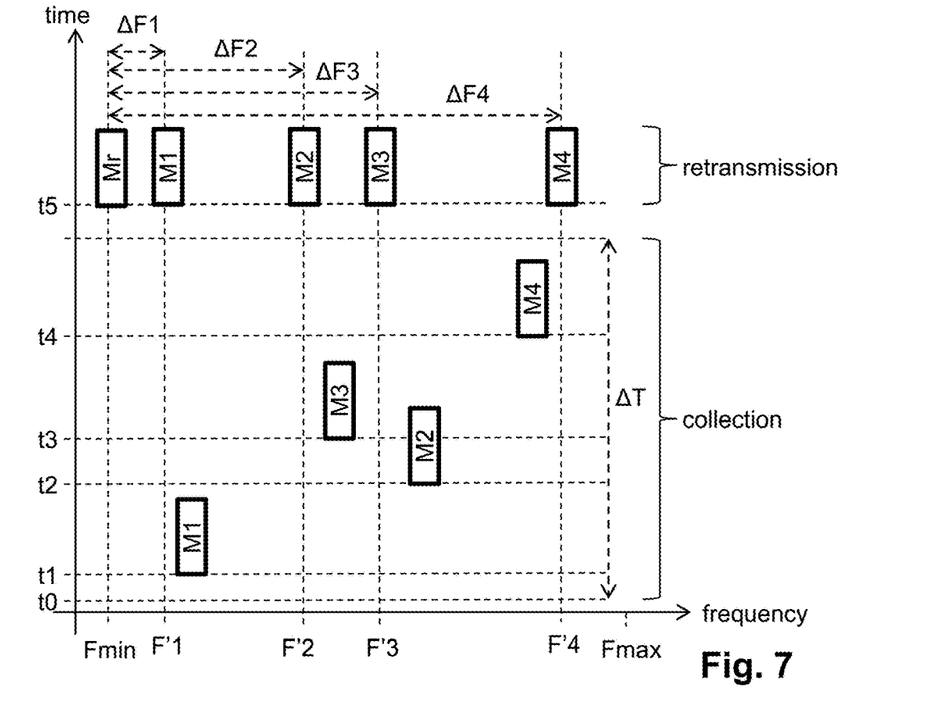
FIG. 7 is a spectrogram illustrating the operation of a second variant of the wireless communication method of FIG. 5.

The reference frequency, if it is not known to the access network 30, may for example be indicated in a reference message formed and transmitted by the repeater device 40. Alternatively, the repeater device 40 may form a reference message (which may include information useful for estimating the reference instant) and transmitted directly on the reference frequency, which belongs where applicable to the frequency band of the uplink. FIG. 7 shows schematically a spectrogram that repeats the same elements as FIG. 6, and which furthermore shows a reference message Mr that is transmitted simultaneously with the retransmitted messages, on the reference frequency, which corresponds in this example to the minimum frequency Fmin of the frequency band of the uplink. Such a transmission of a reference message Mr on the reference frequency is advantageous in that it enables the access network 30 to estimate any error introduced by the repeater device 40 on the generation of the frequencies. By measuring the reception frequency of the reference message, and by comparing this reception frequency with the reference frequency as generated by the access network 30, it is possible to synchronise in frequency the repeater device 40 and the base station 31 that received the reference message. Such a synchronization in frequency makes it possible to estimate with greater precision the frequency differences applied by the repeater device 40, and therefore to estimate with greater precision the instants of reception of the messages by the repeater device 40.

It should be noted that what was described previously in the case where the retransmission frequencies are determined according to the instants of reception of the messages by the repeater device 40 can be extended to other physical properties of the retransmitted messages.

In particular, it is possible to encode the instants of reception of the messages received by the repeater device 40 in the power of retransmission of the messages by the repeater device 40. Where applicable, the repeater device 40 may for example measure the instants of reception of the messages received during the collection window, and determine the retransmission powers of the messages according to the reception instants of the messages. For example, the retransmission powers of the messages are determined so that a difference in power between a retransmission power of a message and a predetermined reference power represents a difference in time between the reference instant and the instant of reception of the message by the repeater device 40. Where applicable, the reference power is for example the transmission power of a reference message formed by the repeater device 40. For its part, the access network 30 may for example measure the reception powers of the retransmitted messages and of the reference message (which represent retransmission powers and the reference power to within propagation losses), and timestamp the messages retransmitted by the repeater device 40 according to the reception powers of the retransmitted messages and of the reference message, in a similar manner to what was described previously.

It is also possible to consider retransmission physical properties, other than the retransmission frequency or the retransmission power, for encoding the instants of reception of the messages by the repeater device 40. In particular, it is also possible to encode the instants of reception of the messages by the repeater device 40 in the retransmitted-messages phase. For example, the message retransmission phases are determined so that a phase difference between a retransmission phase of a message and a predetermined reference phase represents a difference in time between the reference instant and the instant of reception of the message by the repeater device 40. Where applicable, the reference phase is for example the initial phase of transmission of a reference message formed by the repeater device 40. For its part, the access network 30 may for example measure the reception phases of the retransmitted messages and of the reference message (which represent the retransmission phases and the reference phase to within any phase differences introduced by propagation), and timestamp the messages retransmitted by the repeater device 40 according to the reception phases of the retransmitted messages and of the reference message, in a similar manner to what was described previously.

It should be noted that the reference message, optionally transmitted by the repeater device 40, may take any adapted form. In particular, the reference message may, in some embodiments, be in the form of a non-modulated carrier frequency (i.e., a sinusoidal signal), in particular when the reference message is transmitted on the reference frequency and/or with the reference power.

More generally, it should be noted that the embodiments and implementations considered above were described by way of non-limitative examples, and that other variants can consequently be envisaged.

In particular, in describing the invention, a repeater device 40 on an uplink between terminals 20 and an access network 30 of a wireless communication system 10 has been considered. However, the invention is also applicable to the downlink between the access network 30 and the terminals 20, or even in a wireless communication system 10 of the ad hoc type to allow for example exchanges between terminals 20, without an infrastructure of the access network 30 type. The invention can therefore be extended to a repeater device 40 that retransmits, to at least one receiver device, messages received from transmitting devices. On the uplink described previously, the transmitting devices correspond to terminals 20 and/or to other repeater devices, while the receiver devices correspond to base stations 31 and/or to other repeater devices. On the downlink described previously, the transmitter devices correspond to base stations 31 and/or to other repeater devices, while the receiver devices correspond to terminals 20 and/or to other repeater devices.

Furthermore, in describing the invention, the case where at least two messages received non-simultaneously during the collection window are simultaneously retransmitted by the repeater device 40 has mainly been considered. More generally, it is also possible to envisage not necessarily simultaneously retransmitting at least two messages, provided that the instants of retransmission of the messages received are determined so as to increase the time overlap between the messages during the retransmission compared with the time overlap between these same messages when they are received during the collection window.

The invention claimed is:

1. A method for wireless communication between a plurality of transmitter devices and at least one receiver device by means of a repeater device on a surface of Earth, the plurality of transmitter devices transmitting messages in a frequency band of the plurality of transmitter devices that are received by the repeater device, the repeater device retransmitting the messages received in the frequency band to said at least one receiver device, the method comprises:
collecting, by the repeater device, the messages transmitted by the plurality of transmitter devices and received by the repeater device during a collection window;
retransmission, by the repeater device, of the messages received during the collection window to said at least one receiver device, the messages received during the collection window are retransmitted simultaneously to said at least one receiver device for at least two messages received non-simultaneously; and
wherein in response to a determination that a total instantaneous power necessary for simultaneously retransmitting all messages received during the collection window is higher than a predefined maximum power, only some of the messages received during the collection window are retransmitted simultaneously.

2. The method of claim 1, wherein the collection window is interrupted as soon as a total instantaneous power necessary for simultaneously retransmitting all messages received during the collection window is higher than a predefined maximum power.

3. The method of claim 1, wherein the messages received during the collection window are sorted in a decreasing order of message size, and groups are formed successively with longest messages, a number of messages in each group being limited so that the total instantaneous power necessary for simultaneously retransmitting all messages of the group is lower than a predefined maximum power.

4. The method of claim 1, further comprising:
measuring, by the repeater device, instants of reception of the messages received during the collection window;
determining, by the repeater device and according to the instants of reception of the messages, respective values of a physical property of the messages to be used during the retransmission of the messages; and
retransmitting the messages, by the repeater device, using the respective values of the physical property determined according to the instants of reception of the messages.

5. The method of claim 4, wherein a respective value of the physical property of a message retransmitted is determined such that a difference between a value of the physical property of the retransmitted message and a predetermined reference value of the physical property represents a difference in time between a reference instant and an instant of reception of the message by the repeater device.

6. The method of claim 5, further comprising forming and transmitting, by the repeater device, a reference message using the predetermined reference value of the physical property.

7. The method of claim 4, further comprising:
measuring, by said at least one receiver device, values of the physical property of the messages received from the repeater device; and
timestamping, by said at least one receiver device, the messages retransmitted by the repeater device according to the values of the physical property measured of the messages received by said at least one receiver device.

8. The method of claim 4, wherein the physical property corresponds to one of the following: a frequency of the messages, a power of the messages and a phase of the messages.

9. A repeater device configured to receive, on a surface of Earth, messages transmitted in a frequency band by transmitter devices and to retransmit the messages received in the frequency band to at least one receiver device, the repeater device comprising:
a processing circuit configured to collect the messages transmitted by the transmitter devices and received by the repeater device during a collection window;
a transmitter to retransmit the messages received during the collection window to said at least one receiver device, the messages received during the collection window are retransmitted simultaneously to said at least one receiver device for at least two messages received non-simultaneously; and
wherein in response to a determination that a total instantaneous power necessary for simultaneously retransmitting all messages received during the collection window is higher than a predefined maximum power, only some of the messages received during the collection window are retransmitted simultaneously.

10. The repeater device of claim 9, wherein the collection window is interrupted as soon as a total instantaneous power necessary for simultaneously retransmitting all messages received during the collection window is higher than a predefined maximum power.

11. The repeater device of claim 9, wherein the messages received during the collection window are sorted in a decreasing order of message size, and groups are formed successively with longest messages, a number of messages in each group being limited so that the total instantaneous power necessary for simultaneously retransmitting all messages of the group is lower than a predefined maximum power.

12. The repeater device of claim 9, wherein the processing circuit is configured to measure instants of reception of the messages received during the collection window, and to determine, according to the instants of reception of the messages, respective values of a physical property of the messages to be used during the retransmission of the messages; and wherein the transmitter is configured to retransmit the messages using the respective values of the physical property determined according to the instants of reception of the messages.

13. The repeater device of claim 12, wherein the processing circuit is configured to determine a respective value of the physical property of a message retransmitted such that a difference between a value of the physical property of the retransmitted message and a predetermined reference value of the physical property represents a difference in time between a reference instant and an instant of reception of the message by the repeater device.

14. The repeater device of claim 13, wherein the processing circuit is configured to form a reference message using the reference value of the physical property; and wherein the transmitter is configured to transmit the reference message.

15. The repeater device of claim 12, wherein the physical property corresponds to one of the following: a frequency of the messages, a power of the messages and a phase of the messages.

16. A wireless communication system comprising at least one repeater device configured to receive, on a surface of Earth, messages transmitted in a frequency band by transmitter devices and to retransmit the messages received in the frequency band to at least one receiver device, said at least one repeater device comprising:
  a processing circuit configured to collect the messages transmitted by the transmitter devices and received by said at least one repeater device during a collection window; and
  a transmitter to retransmit the messages received during the collection window to said at least one receiver device, the messages received during the collection window are retransmitted simultaneously to said at least one receiver device for at least two messages received non-simultaneously; and
  wherein in response to a determination that a total instantaneous power necessary for simultaneously retransmitting all messages received during the collection window is higher than a predefined maximum power, only some of the messages received during the collection window are retransmitted simultaneously.

17. The wireless communication system of claim 16, wherein the processing circuit is configured to measure instants of reception of the messages received during the collection window, and to determine, according to the instants of reception of the messages, respective values of a physical property of the messages to be used during the retransmission of the messages;
  wherein the transmitter is configured to retransmit the messages using the respective values of the physical property determined according to the instants of reception of the messages; and
  wherein said at least one receiver device comprises a second processing circuit configured to: measure values of the physical property of the messages received from said at least one repeater device; and timestamp the messages transmitted by said at least one repeater device according to the values of the physical property measured of the messages received by said at least one receiver device.

* * * * *